US007629961B2

(12) United States Patent  
Casebolt et al.

(10) Patent No.: US 7,629,961 B2  
(45) Date of Patent: Dec. 8, 2009

(54) DYNAMICALLY ADJUSTING OPERATION OF ONE OR MORE SENSORS OF A COMPUTER INPUT DEVICE

(75) Inventors: Mark W. Casebolt, Seattle, WA (US); Mark R. Lee, Edmonds, WA (US); Jeremiah M. Pope, Kirkland, WA (US); James C. Marshall, Puyallup, WA (US)

(73) Assignee: Microsoft Corporation, Redmond, WA (US)

( * ) Notice: Subject to any disclaimer, the term of this patent is extended or adjusted under 35 U.S.C. 154(b) by 867 days.

(21) Appl. No.: 10/788,444

(22) Filed: Mar. 1, 2004

(65) Prior Publication Data

US 2005/0190158 A1 Sep. 1, 2005

(51) Int. Cl.
G09G 5/08 (2006.01)
(52) U.S. Cl. .................. 345/166; 345/156; 345/163
(58) Field of Classification Search .................. 345/156, 345/157, 163–167
See application file for complete search history.

(56) References Cited

U.S. PATENT DOCUMENTS

| | | | | |
|---|---|---|---|---|
| 5,162,781 A | * | 11/1992 | Cambridge | 345/163 |
| 6,455,840 B1 | * | 9/2002 | Oliver et al. | 250/222.1 |
| 6,995,748 B2 | * | 2/2006 | Gordon et al. | 345/166 |
| 6,995,749 B2 | * | 2/2006 | Friend | 345/169 |
| 7,064,311 B2 | * | 6/2006 | Jung et al. | 250/205 |
| 7,161,586 B2 | * | 1/2007 | Lauffenburger et al. | 345/166 |
| 7,220,956 B2 | * | 5/2007 | Feldmeier et al. | 250/221 |

2002/0035701 A1 3/2002 Casebolt et al.

OTHER PUBLICATIONS

W. LaLonde et al., "A Velocity-Sensitive Mouse," JOOP, Sep. 1998, pp. 76-79 and 87.
Marcelo C. Algrain et al., "Accelerometer Based Line-of-Sight Stabilization Approach for Pointing and Tracking Systems," Second IEEE Conference on Control Applications, Vancouver BC, pp. 159-163 (Sep. 13-16, 1993).
Marcelo C. Algrain, "Gyroless line-of-sight stabilization for pointing and tracking systems," Optical Engineering, vol. 33, No. 4, pp. 1255-1260 (Apr. 1994).
Frank J. Almendinger et al., "Flight Motion Simulator Performance Improvements from Advanced Data Acquisition," Technologies for Synthetic Environments: Hardware in the Loop Testing VI, Proc. Of SPIE vol. 4366, pp. 308-319 (2001).
Pierre R. Bélanger, "Estimation of Angular Velocity and Acceleration from Shaft Encoder Measurements," Proc. 1992 IEEE Int'l Conf. On Robotics & Automation, Nice, France, (May 1992), pp. 585-592.

(Continued)

Primary Examiner—Regina Liang
Assistant Examiner—Jennifer T Nguyen
(74) Attorney, Agent, or Firm—Woodcock Washburn LLP

(57) ABSTRACT

A computer input device controller dynamically adjusts the rate at which an illumination source is activated, and may also adjust the rate at which other optical tracking system components are activated. As the velocity of optical tracking system movement relative to a tracked surface increases, the controller increases the activation rate(s). As the velocity of relative movement decreases, the controller decreases the activation rate(s). Future displacements of a tracking system relative to a tracked surface are also estimated. In particular, relative tracking system/tracked surface velocity is calculated based on a series of images. Relative displacement is then estimated based on the calculated velocity.

25 Claims, 15 Drawing Sheets

OTHER PUBLICATIONS

Michel Chahine et al., "Motion-compensated interpolation using trajectories with acceleration," SPIE Symp. On Elec. Imaging, *Digital Video Compression*, vol. 2419, San Jose, CA (Feb. 5-10, 1995).

Christopher Fagiani et al., "Evaluation of Tracking Methods for Human-Computer Interaction," Sixth IEEE Workshop on Applications of Computer Vision, Orlando, FL (Dec. 3-4, 2002).

Seungbae Lee et al., "Two-Dimensional Position Detection System with MEMS Accelerometer for MOUSE Applications," Annual ACM IEEE Design Automation Conf., Proceedings of the $38^{th}$ Conf. On Design Automation, Las Vegas, NV (2001).

Anant Kartik Mithal et al., "Differences in Movement Microstructure of the Mouse and the Finger-Controlled Isometric Joystick," Conf. On Human Factors in Computing Systems, Proceeding of the SIGCHI Conf. On Human Factors in computing Systems: Common Ground, Vancouver, Canada, pp. 300-307 (ACM Press 1996).

Fabrizio S. Rovati et al., "Spatial-Temporal Motion Estimation for Image Reconstruction and Mouse Functionality with Optical or Capacitive Sensors," IEEE (2003).

U.S. Appl. No. 10/305,062.

U.S. Appl. No. 10/058,384.

U.S. Appl. No. 10/408,125.

U.S. Appl. No. 10/319,470.

\* cited by examiner

DYNAMICALLY ADJUSTING OPERATION OF ONE OR MORE SENSORS OF A COMPUTER INPUT DEVICE

FIELD OF THE INVENTION

This invention relates to power management in electronic devices. In particular, the present invention relates to power management in a computer input device.

BACKGROUND OF THE INVENTION

Wireless communication over relatively short distances is a common and increasingly important feature of electronic devices. In some cases, for example, an electronic device or other appliance is controlled by another electronic device which must communicate instructions to the controlled device (and perhaps receive information from the controlled device). Examples include computer input devices such as mice. Among other advantages, wirelessly transmitting data and/or control signals between a computer and a mouse can dramatically increase user convenience and reduce clutter from multiple connecting cables.

An inherent challenge with wireless devices such as computer mice is power management. Wireless devices are usually battery powered. To prolong battery life, it is desirable to reduce the device's power consumption as much as possible. Many wireless mice utilize an optical tracking system to determine mouse movement. By creating and correlating overlapping images of the surface across which a mouse moves, the mouse "navigates," i.e., measures relative motion across that surface. Although a significant advancement, the imaging components necessary for optical tracking consume a substantial amount of power. For example, existing CMOS technology used in some imagers requires an extraordinarily bright light source to illuminate the imaged region. This light source (typically a LED) draws a substantial amount of current when illuminated, and is often activated at relatively high rates (1500 frames per second or higher). When activated at a high rate for prolonged periods, the light source (as well as the processing electronics) exhibit a significant drain on battery power.

SUMMARY OF THE INVENTION

The present invention addresses the above and other challenges associated with power consumption by computer input devices. In at least some embodiments of the invention, a controller dynamically adjusts the rate at which an illumination source is activated, and may also adjust the rate at which other optical tracking system components are activated. As the velocity of optical tracking system movement relative to a tracked surface increases, the controller increases the activation rate(s). As the velocity of relative movement decreases, the controller decreases the activation rate(s). In at least some additional embodiments, future displacements of a tracking system relative to a tracked surface are estimated. In particular, relative tracking system/tracked surface velocity is calculated based on a series of images. Relative movement is then estimated based on the calculated velocity.

In one embodiment, the invention includes a computer input device having an electronic imager positioned to create images of at least a portion of a surface moving relative to the imager. The device further includes an illumination source positioned to illuminate at least a portion of the moving surface and at least one controller coupled to the imager and the illumination source. The controller is configured to selectively activate the illumination source, receive images from the imager, and determine (based on at least some of the images) a velocity of the imager relative to the surface. The controller activates the illumination source at one of at least three activation rates when the imager velocity is being determined. The controller selects an activation rate based at least in part upon the determined imager velocity. In another embodiment, a controller is configured to determine, based on a first set of images, velocity of an imager relative to a surface. The controller is further configured to estimate imager displacement relative to the surface based on imager velocity and an elapsed time since movement from a position corresponding to one or more of the images of the first set. In yet another embodiment, a computer input device includes a sensor positioned to detect changes in a measurable parameter, a power source and a controller. The controller is coupled to the sensor and the power source, and is configured to selectively activate the sensor, receive data from the sensor, and determine a sensor velocity. The controller activates the sensor at one of at least three activation rates when velocity is being determined, and selects an activation rate based at least in part upon the velocity.

These and other features and advantages of the present invention will be readily apparent and fully understood from the following detailed description of preferred embodiments, taken in connection with the appended drawings.

DETAILED DESCRIPTION OF THE PREFERRED EMBODIMENTS

The present invention permits improved power management in a wireless computer input device. Although the invention is described using a wireless, optically-tracking computer mouse as an example, the invention may also be implemented in other wireless devices using optical tracking. As but one example, the invention could also be implemented in a wireless trackball. In an optically tracking trackball, the tracked surface may be the outer surface of a ball which is rotatably captured within a housing. An imager within the housing detects displacement of the ball surface (relative to the imager) as a user rotates the ball. As another example, the invention could be implemented in an optical scroll wheel. In such scroll wheels, a rotating wheel is imaged, and the speed (and direction) of rotation relative to the imager determined. The invention may also be implemented in a computer input device having other types of sensors (e.g., pressure sensors, capacitive sensors, etc.).

In at least one embodiment of the invention, the imaging rate of the optical tracking system for a computer mouse is dynamically adjusted based on the velocity of mouse movement over a work surface. Because slower imaging rates can be used when the mouse moves more slowly, the amount of time which an illumination source is active (and thus drawing power) is reduced for slower mouse motion. In at least one other embodiment, future displacement of a mouse is estimated based on current mouse velocity. By estimating future displacement based on current velocity, it is possible to reduce the amount of time that an imaging light source and processing electronics must be active by reporting the displacement estimates while less periodically verifying velocity (or adjusting velocity used for displacement estimation). Additional features of the invention are described in more detail below.

Figure 1:
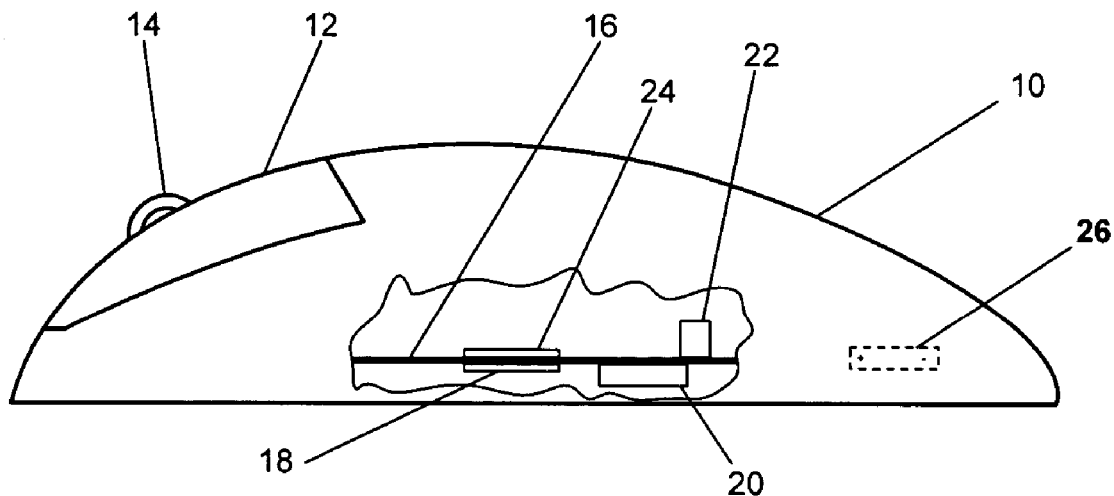
FIG. 1 is a cutaway side view of a computer mouse.

FIG. 1 is a side, cutaway view of a mouse 10 in which various embodiments of the invention are implemented. Mouse 10 may have one or more buttons 12 which can be pressed by a user, a scroll wheel 14 or other types of input controls which can be actuated by a user. The number, arrangement and types of input controls shown are merely exemplary, and other combinations and arrangements are within the scope of the invention. Mouse 10 also has at least one internal circuit board 16 upon which various electronic components are connected and physically supported. These components include an imaging array 18, a LED (light emitting diode) 20, a RF antenna 22, a controller 24 and a battery 26. Other components, not shown in FIG. 1, may include memory and other electrical components. LED 20 emits light which illuminates an area of a desktop or other surface, and which is imaged by imaging array 18. Images from array 18 are then compared and correlated to detect movement of mouse 10 across the desktop or other surface. Other components could be used in a mouse according to various embodiments of the invention. For example, an illumination source other than a LED could be used (e.g., an edge-emitting laser or a vertical cavity surface emitting laser). As another example, RF antenna 22 could be implemented as a set of traces on circuit board 16.

Figure 2:
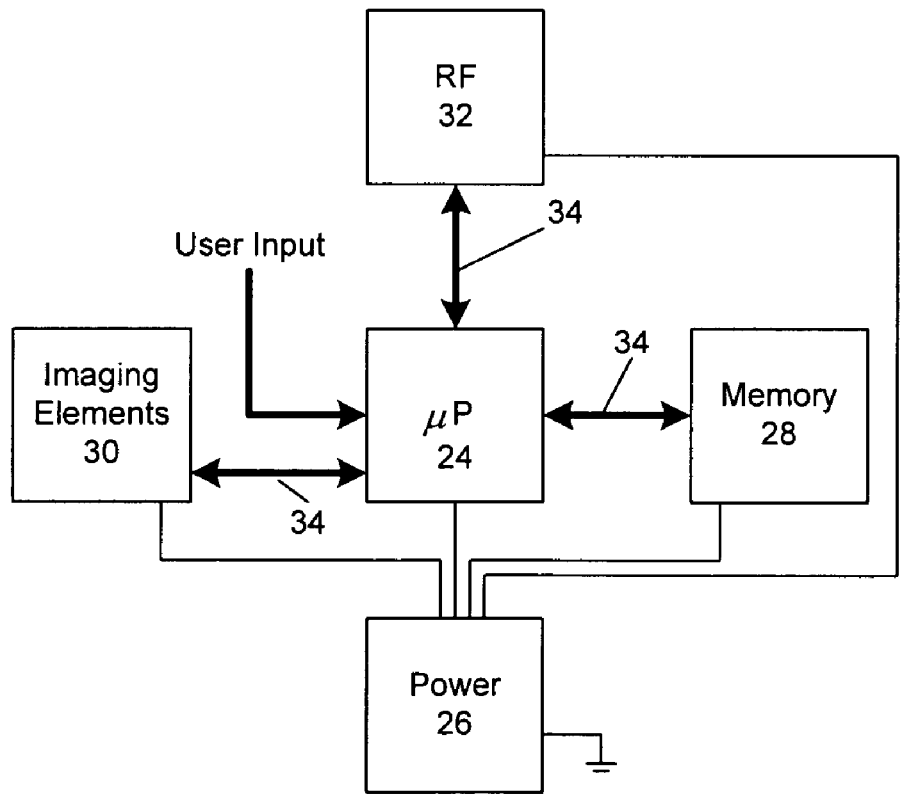
FIG. 2 is a block diagram of the mouse of FIG. 1.

FIG. 2 is a block diagram of the internal circuitry of mouse 10 according to at least one embodiment of the invention. Operation of mouse 10 is controlled by a controller 24. Although controller 24 is shown as a microprocessor (μP), controller 24 could alternatively include state machine circuitry or other suitable components capable of controlling operation of mouse 10 as described herein. Controller 24 communicates with memory 28. Memory 28, which may include volatile and non-volatile memory, is a machine-readable medium used for storage of software (or firmware) instructions, imaging data and other information (such as algorithms discussed in more detail below). Memory 28 may include a rewritable non-volatile component, such battery-backed SRAM or EEPROM, and/or a non-rewritable component such as ROM. Controller 24 also controls LED 20 (FIG. 1), imaging array 18 and other imaging elements, all of which are represented collectively by imaging elements block 30. Controller 24 further controls RF communication circuitry 32, and passes data to RF communication circuitry 32 for communication to a computer (not shown) over antenna 22 (FIG. 1). Similarly, data communicated to mouse 10 is received via antenna 22 and RF circuitry 32, and transmitted to controller 24. Controller 24 communicates with imaging elements 30, RF circuitry 32 and memory 28 over one or more buses 34, shown collectively as bold bi-directional arrows. Controller 24 also receives electrical signals that correspond to a user's actuation of a mouse button 12 (FIG. 1), scroll wheel 14 or other input control. These electrical signals are represented collectively in FIG. 2 as "User Input." The various electrical components of mouse 10 are powered by a battery 26.

Although FIGS. 1 and 2 show controller 24, imaging array 18, RF circuitry 32 and memory 28 as discrete components, this need not be the case. For example, one or more of these components might be contained in a single Integrated Circuit (IC) or other component. In at least one embodiment, imaging array 18 is contained in an integrated circuit containing both light sensitive elements and circuitry for converting received light into electrical signals. One such device is described in commonly-owned U.S. patent application Ser. No. 10/305,062, titled "Photo-Sensor Array for Motion Detection" and filed Nov. 27, 2002. Other image sensor integrated circuits are known in the art and are commercially available. As another example, controller 24 may include internal program memory such as ROM. Similarly, the herein described functions of these components could be distributed across additional components (e.g., multiple controllers or other components). As yet another example, LED 20 may be positioned to illuminate a work surface via one or more light guides, lenses or other components.

Figure 3:
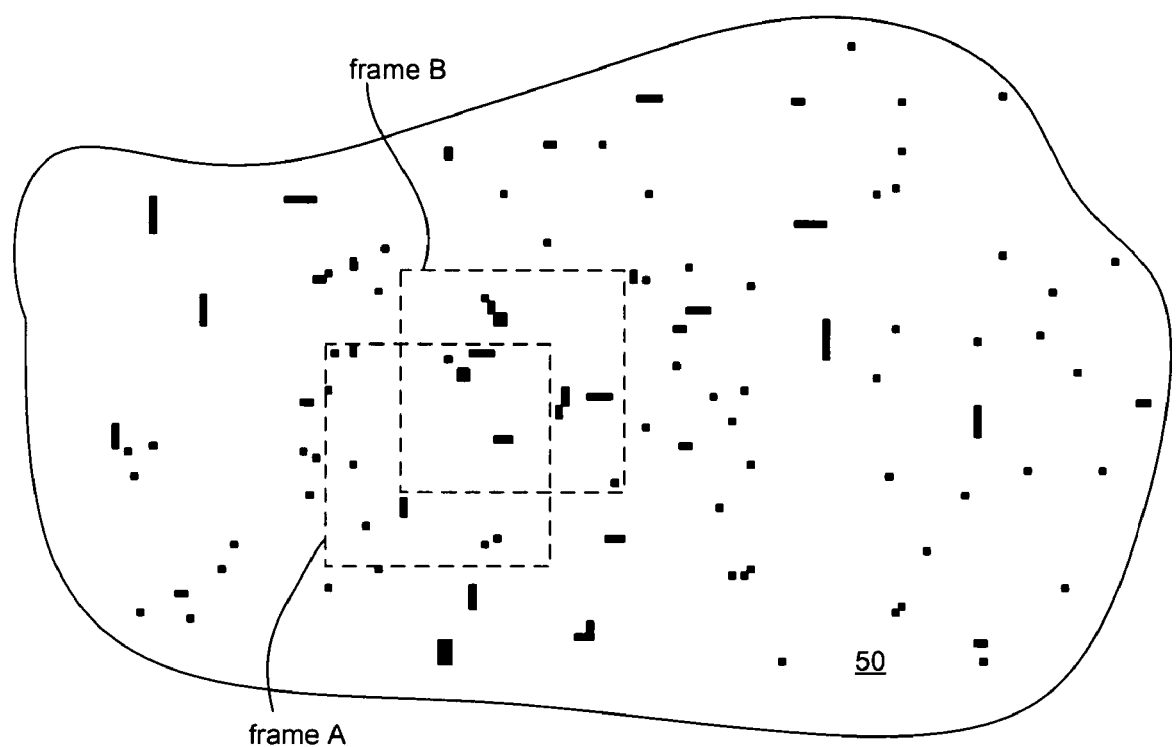
FIG. 3 shows successive image frames of a mouse moving across a work surface.
Figure 4:
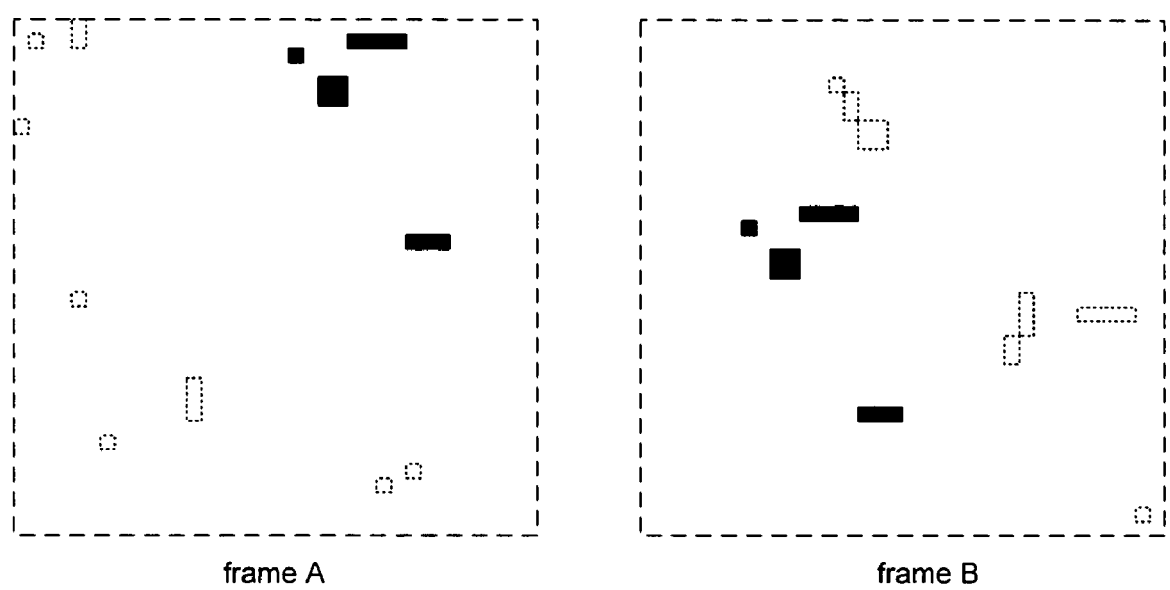
FIG. 4 shows modified versions of the image frames of FIG. 3.

The required imaging (or "frame") rate for an optical mouse varies based upon the velocity with which the mouse moves across a work surface. FIG. 3 shows a portion of a work surface 50 over which a mouse moves. Randomly arranged and shaped darkened areas represent surface features of work surface 50. Also shown in FIG. 3 are outlines of two successive images (frame A, frame B) created by the imaging elements of a mouse moving across work surface 50. As shown in FIG. 3, there is a substantial overlap between frames A and B. FIG. 4 shows enlarged versions of frames A and B. For purposes of explanation, the features of work surface 50 within the intersection of frames A and B are shown as darkened shapes in FIG. 4, while the other features within frames A and B are shown as outlines. As seen in FIG. 4, the direction and amount of surface 50 displacement relative to the mouse imager can be determined by comparing frames A and B. If the imager is fixed within the mouse housing, this will correspond to mouse movement relative to surface 50. Methods and systems for determining displacement based on overlapping images of a work surface are known in the art, and thus not further described. Using the time between frames A and B and the size of the frame boundary, embodiments of the invention use this displacement information to determine the velocity of mouse motion.

Figure 5:
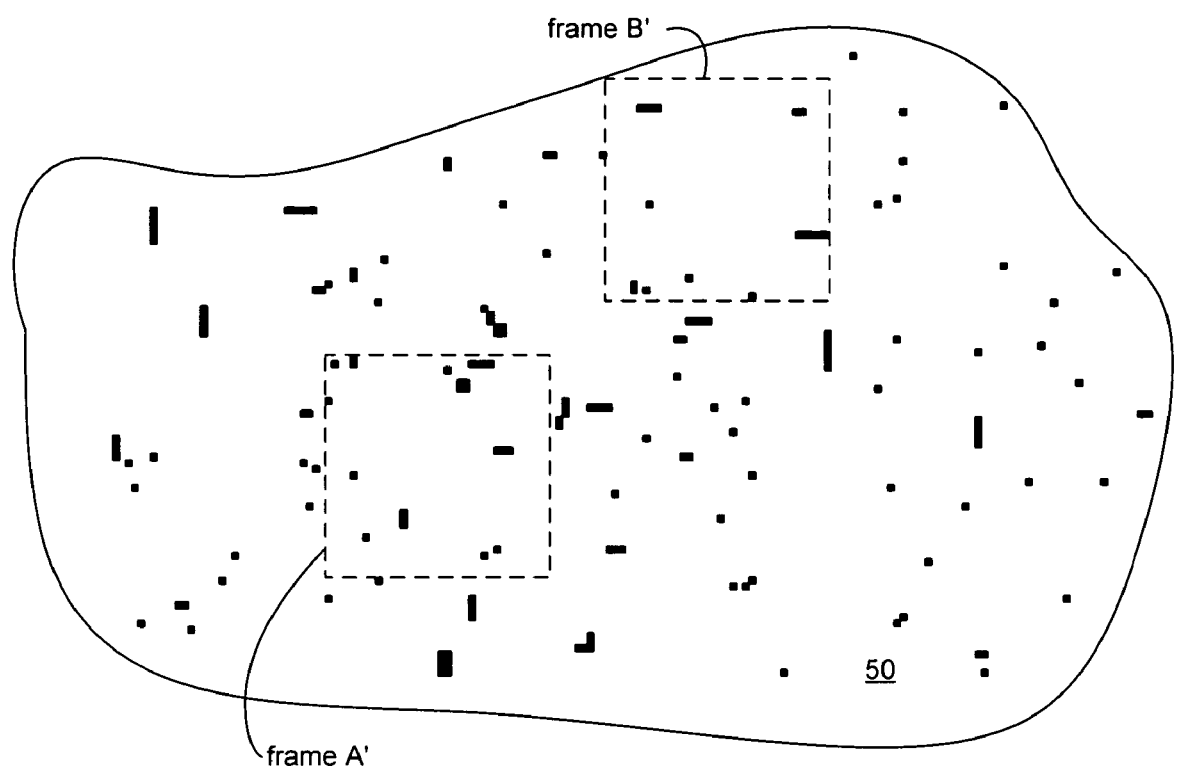
FIG. 5 shows successive image frames created at a rate that is too low by comparison to velocity of mouse movement.

FIG. 5 shows what occurs if the frame rate is not sufficiently fast. In the example of FIG. 5, there is no overlap between frame A' and frame B'. In other words, the time between frames A' and B' was sufficiently long to allow the imaging frame to move to a position of no overlap. Because there is no overlap between successive images, there are no common features within the images that can be correlated, and the displacement of the mouse relative to surface 50 (and thus, mouse velocity) is not determinable from frames A' and B'.

Figure 6:
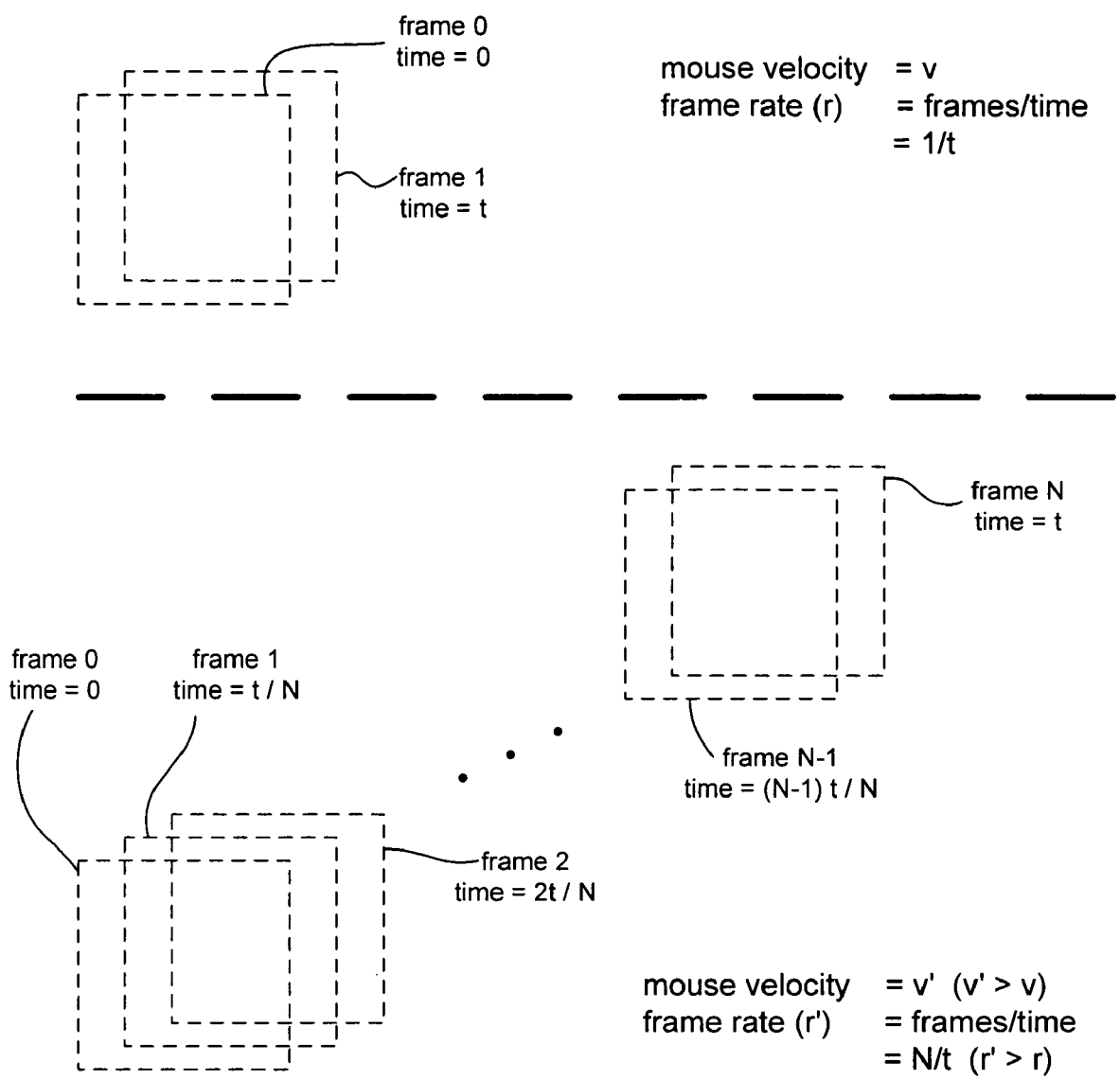
FIG. 6 illustrates imaging at different rates based on velocity of mouse movement across a work surface.

According to at least one embodiment of the invention, controller 24 (FIGS. 1 and 2) of mouse 10 varies the activation rate of some or all of imaging elements 30 based on the velocity of mouse 10. In the upper portion of FIG. 6, mouse 10 moves over a work surface at a velocity v for time t. Although a mouse will typically determine displacement along orthogonal axes (e.g., x and y axes), FIG. 6 shows displacement (and thus, velocity) in a single arbitrary direction for simplicity. Imaging elements 30 (FIG. 2) create two overlapping images (frame 0, frame 1) at a rate r=1/t. In the lower portion of FIG. 6, mouse 10 moves over the work surface at a velocity v' (where v'>v) for the same amount of time t. During the movement shown in the lower part of FIG. 6, imaging elements 30 create N successive images (frames 0 through N) at a rate r'. Successive images generated during movement at velocity v' overlap by the same amount as the images created during the slower movement at velocity v. So as not to obscure the drawing with unnecessary detail, additional overlapping images between frame 2 and frame N−1 are represented as an ellipsis. As seen in FIG. 6, rate r'=N/t, and r'>r. In other words, during periods of slower movement, imaging elements 30 (including LED 20) may be operated at a reduced rate. FIG. 6 is a simplified example, and does not include rotation of the imaging frame or curvilinear mouse movement. However, most mouse movements can be approximated by a series of straight line movements without mouse rotation, and the principle illustrated in FIG. 6 also applies in less simplified cases.

Equation (1) is an example of an equation relating frame rate (F, frames per second) to imager velocity (v, inches per second) and the maximum offset between overlapping images that can be accurately resolved ($D_{max}$, inches/frame).

$$F = v/D_{max} \quad (1)$$

The quantity $D_{max}$ will vary based on the tracking algorithm used (i.e., the algorithm used to correlate images and determine relative displacement), but is generally determinable for a given tracking algorithm. An example value is 0.01 inches per frame. In certain embodiments, the velocity (v) used in Equation (1) includes components on x and y axes (e.g., the vector sum of x and y axis velocities). In other embodiments, only the x or y axis velocity is used. In particular, the velocities on both x and y axes are calculated, and the higher velocity used for frame rate determination. As the mouse moves at higher velocities, the image rate increases proportionally in at least one embodiment, as shown in Table 1 below.

TABLE 1

| Mouse Velocity (in./sec.) | Image Rate (Hz) |
|---|---|
| 0.1 | 10 |
| 1.0 | 100 |
| 10 | 1000 |
| 25 | 2,500 |

In some embodiments, an additional margin factor is applied in Equation (1) to account for uncertainties in the system. For example, Equation (1) is modified to $F=k*(v/D_{max})$, where k is a constant greater than 1. In other embodiments, the value of k could increase as velocity (v) increases. In still other embodiments, the frame rate is a function of factors in addition to velocity. For example, and as described below in connection with FIG. 9, the imaging rate can also be varied as a function of mouse acceleration.

Figure 7:
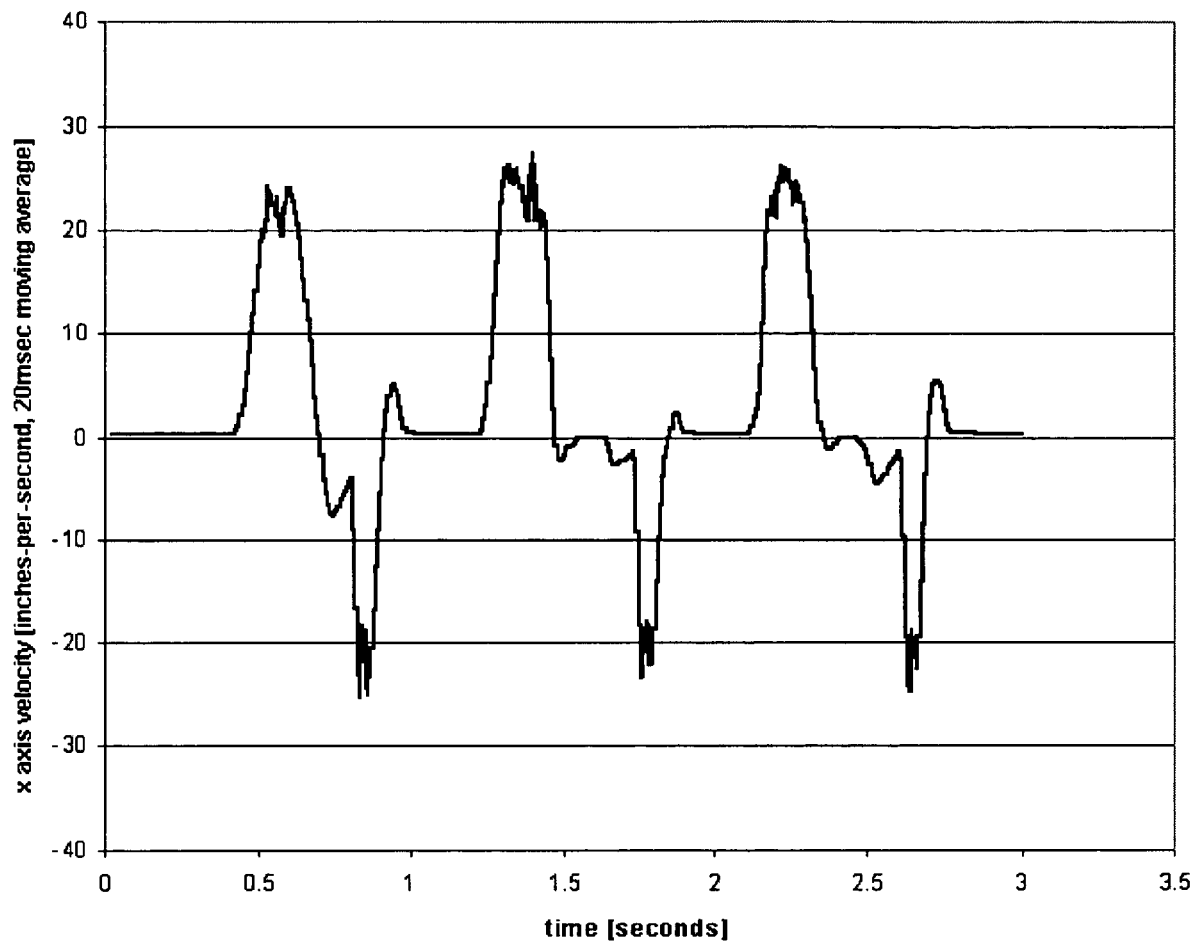
FIG. 7 is a graph of a velocity vs. time velocity profile for a reciprocally moved mouse.
Figure 8:
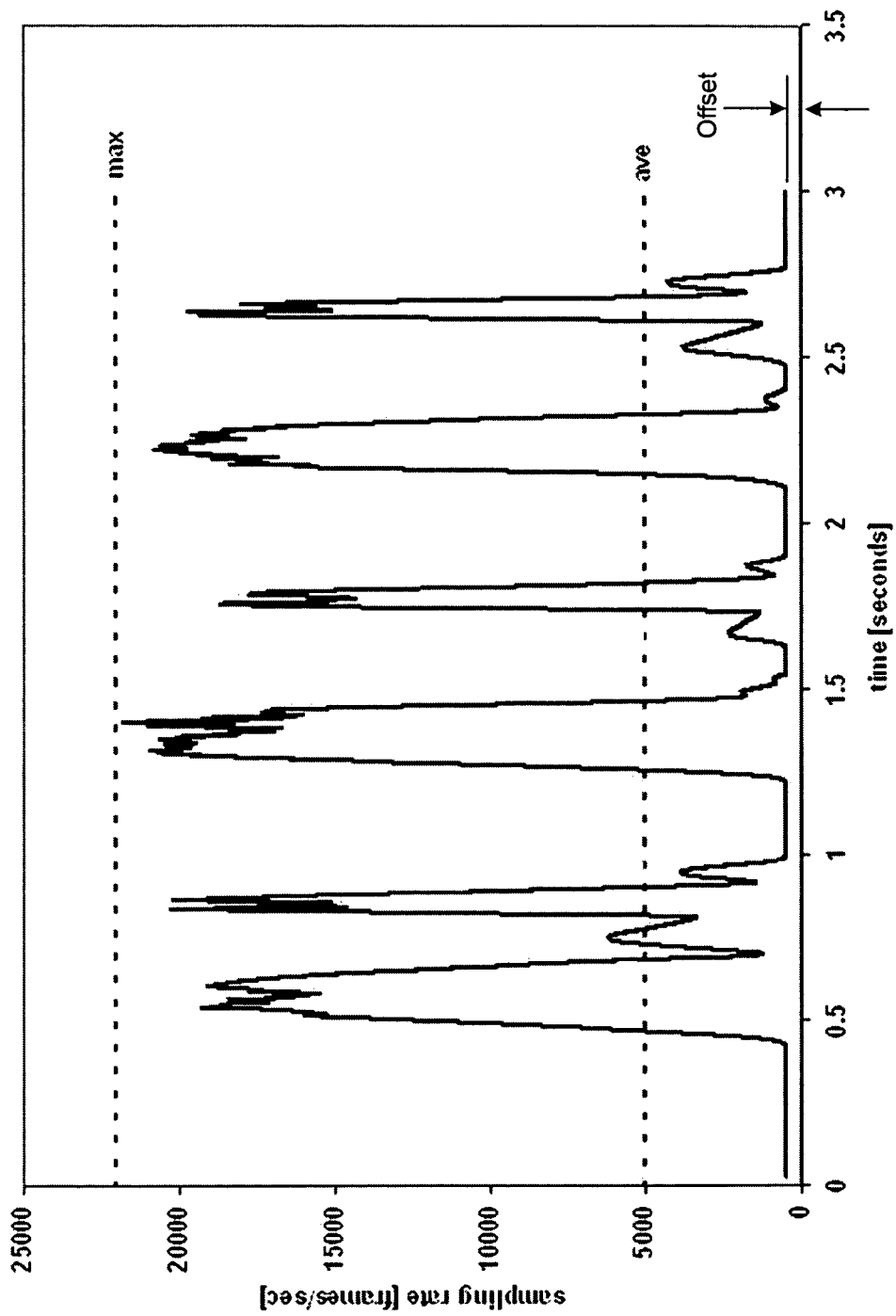
FIG. 8 is a graph of imaging rate vs. time for a mouse moved according to the velocity profile of FIG. 7.

By adjusting the imaging rate based on velocity, LED 20 is activated less frequently. FIGS. 7 and 8 help to show power savings, according to at least one embodiment of the invention, which result from varying imaging rate based on mouse velocity. FIG. 7 shows a velocity profile for a mouse moved reciprocally over a 1 inch section of a work surface. The vertical axis is the velocity (in./sec.) of the mouse at a specific time shown on the horizontal axis. More specifically, FIG. 7 graphs horizontal (x axis) velocity versus time as a user quickly moves a mouse to the right, then to the left, then rests, and then repeats the sequence twice more. The movements occur within a three second interval, and instantaneous velocity is limited to +/−25 in./sec. The velocity profile of FIG. 7 is an example of the upper limit of mouse velocity for a typical user, and illustrates that a mouse is moved at high velocities for a relatively small amount of the total time the mouse is being used.

FIG. 8 shows sampling (or imaging) rate (frames/sec) vs. time for the motion of FIG. 7. In FIG. 8, the imaging rate is varied based on mouse velocity in a manner similar to that shown in FIG. 6, and with imaging performed at a rate sufficient to assure accurate tracking (e.g., to avoid aliasing in the tracking algorithm being used). The small offset in FIG. 8 represents a minimum imaging rate performed by the mouse at all times (in some embodiments). The lower dashed line represents the average imaging rate during the three second interval. The upper dashed line represents the maximum imaging rate during that same time period. A tracking algorithm imaging at a fixed rate would typically image at the maximum rate. By reducing the average imaging rate from the upper ("max") value to a lower ("ave") value, an LED (or other illumination source) is activated for less time.

By reducing the amount of time that LED 20 is activated, battery life is increased. Although LED 20 (or other illumination source used) draws a significant amount of current, data processing necessary for tracking also contributes to current draw. Imaging components are often implemented using CMOS (complementary metal oxide semiconductor) technology, and CMOS current draw increases with clock rate. Lowering frame rate thus lowers signal processing current draw. Battery life for an optically tracking mouse is generally described by Equation (2)

$$\text{Battery Life} = \frac{\text{Battery Capacity (AmpHours)}}{\text{I\_imaging (amps)} + \text{I\_other(amps)}} \quad (2)$$

I_imaging is the current drawn by the imaging elements of the mouse (i.e., the LED light source, the imaging array and components performing tracking calculations). I_other is the current drawn by the remaining mouse components. Because LED 20 will draw a large portion of the current drawn by all imaging components, and I_imaging is greater than I_other, the rate at which LED 20 is activated will significantly affect battery life. As indicated above, however, other imaging components can also draw less current as imaging rate is reduced, i.e., as fewer frames are imaged and fewer tracking calculations performed. The increase in battery life resulting from imaging at a lower average rate ($F\_image_{ave}$) instead of continuing to image at a maximum rate ($F\_image_{max}$) is given by Equation (3).

$$\text{Incr.Batt.Life} = \text{Battery Life}(F\_image_{ave}) - \text{Battery Life}(F\_image_{max}) \quad (3)$$

If the current drawn by the imaging components at the average and maximum rates is respectively $I\_image_{ave}$ and $I\_image_{max}$, and if the current drawn by other mouse components at the average and maximum rates is respectively $I\_other_{ave}$ and $I\_other_{max}$, Equation (3) can then be rewritten as Equation (4).

$$\text{Incr.Batt.Life} = \frac{(\text{Battery Capacity})}{(I\_image_{ave} + I\_other_{ave})} - \frac{(\text{Battery Capacity})}{(I\_image_{max} + I\_other_{max})} \quad (4)$$

$$= \frac{(\text{Battery Capacity})}{(I\_image_{max} + I\_other_{max})} \frac{((I\_image_{max} - I\_image_{ave}) + (I\_other_{max} - I\_other_{ave}))}{(I\_image_{ave} + I\_other_{ave})}$$

$$= (\text{Battery Life Before Change}) \frac{((I\_image_{max} - I\_image_{ave}) + (I\_other_{max} - I\_other_{ave}))}{(I\_image_{ave} + I\_other_{ave})}$$

If $I\_other_{max} \approx I\_other_{ave}$, and if $I\_image_{ave} >> I\_other_{ave}$, Equation (4) is approximated by Equation (5).

$$\text{Incr.Batt.Life} = (\text{Battery Life Before Change}) \left( \left( \frac{I\_image_{max}}{I\_image_{ave}} \right) - 1 \right) \quad (5)$$

If the current requirement is reduced by one half ($I\_image_{ave} = I\_image_{max}/2$), then battery life (Battery Life Before Change+Incr. Batt. Life) is doubled.

Figure 9:
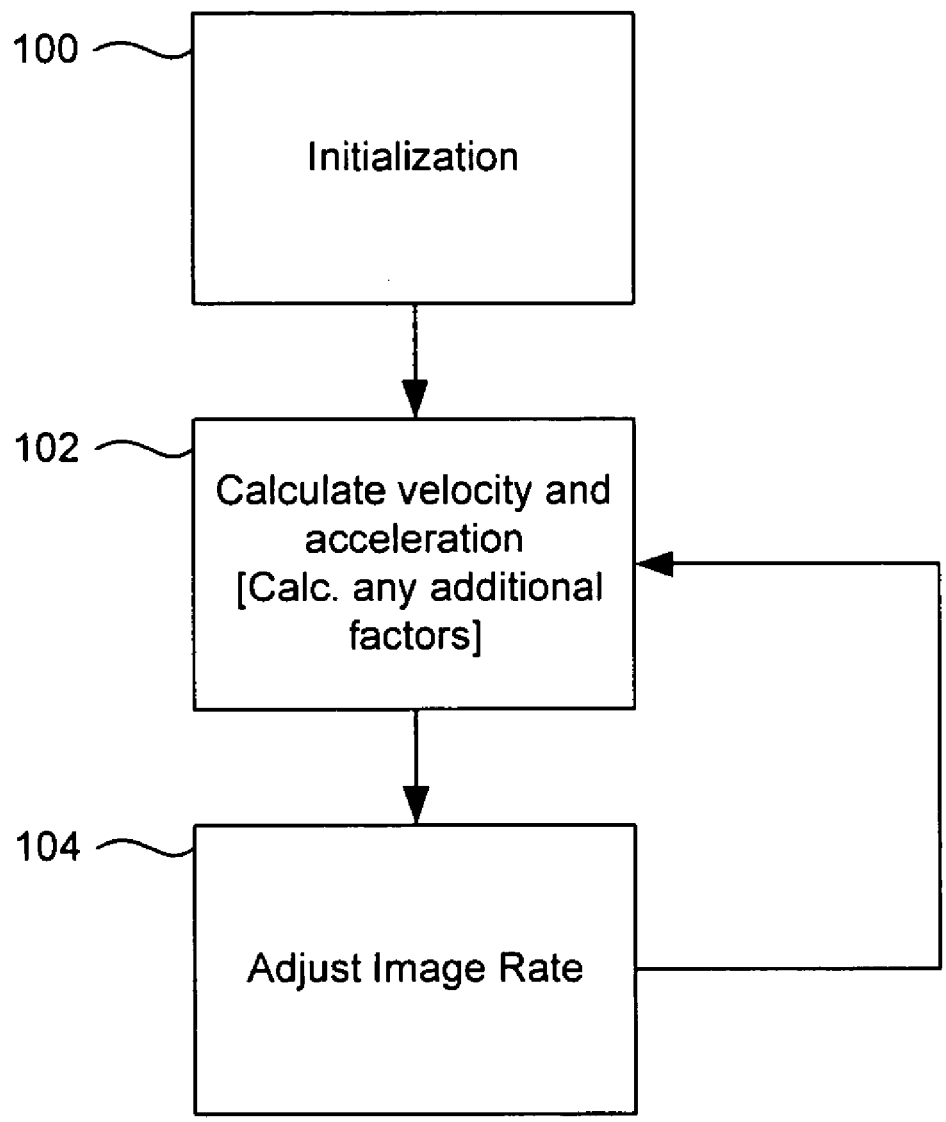
FIG. 9 is a flow chart showing an algorithm varying imaging rate based on mouse velocity.

FIG. 9 is a flow chart showing an algorithm for mouse 10 that varies imaging rate based on mouse velocity and acceleration. After initialization at block 100, controller 24 calculates the present velocity (v) and acceleration (a) of mouse 10 at block 102. In at least some embodiments, controller 24 calculates velocity and acceleration along x and y axes, and adjusts frame rate based on the axis having the highest velocity. In other embodiments, frame rate is adjusted based on x and y components of velocity and acceleration (e.g., the vector sum of the x and y velocities, the vector sum of the x and y accelerations). As described in more detail below, and using the size of the imaging frame (a known value) and the time between images (also a known value), mouse velocity and acceleration can be computed from three or more successive images. Depending on the number of images used for the calculation, additional derivatives for mouse motion (e.g., da/dt, or "jerk," and $d^2a/dt^2$, or "twitch") are also calculated in some embodiments. At block 104, controller 24 adjusts the imaging rate $F_{prediction}$ based on the values calculated in block 102.

In at least one embodiment, controller 24 adjusts the imaging rate $F_{prediction}$ according to Equation (6).

$$F_{prediction} = F(V_{margin}), \quad (6)$$

where:

F( ) is a function mapping to a velocity V the minimum frame rate necessary to accurately determine that velocity, $$V_{margin} = \begin{cases} (1+m) * V_{prediction}, & \text{if greater than } V_{min}, \text{ and} \\ V_{min} & \text{otherwise,} \end{cases}$$

m=a constant (e.g., 0.50),
$V_{min}$=a minimum frame rate supported by the system,
$S_0 = |V_0|$,
$V_0$=current velocity (based on current and previous image),
$A_0 = (V_0/|V_0|)*(V_0 - V_{-1})$,
$V_{-1}$=previous velocity (based on previous images), $$V_{prediction} = \begin{cases} |S_0 + A_0|, & \text{if } A_0 > 0, \text{ and} \\ |S_0| & \text{if } A_0 < 0. \end{cases}$$

Figure 10:
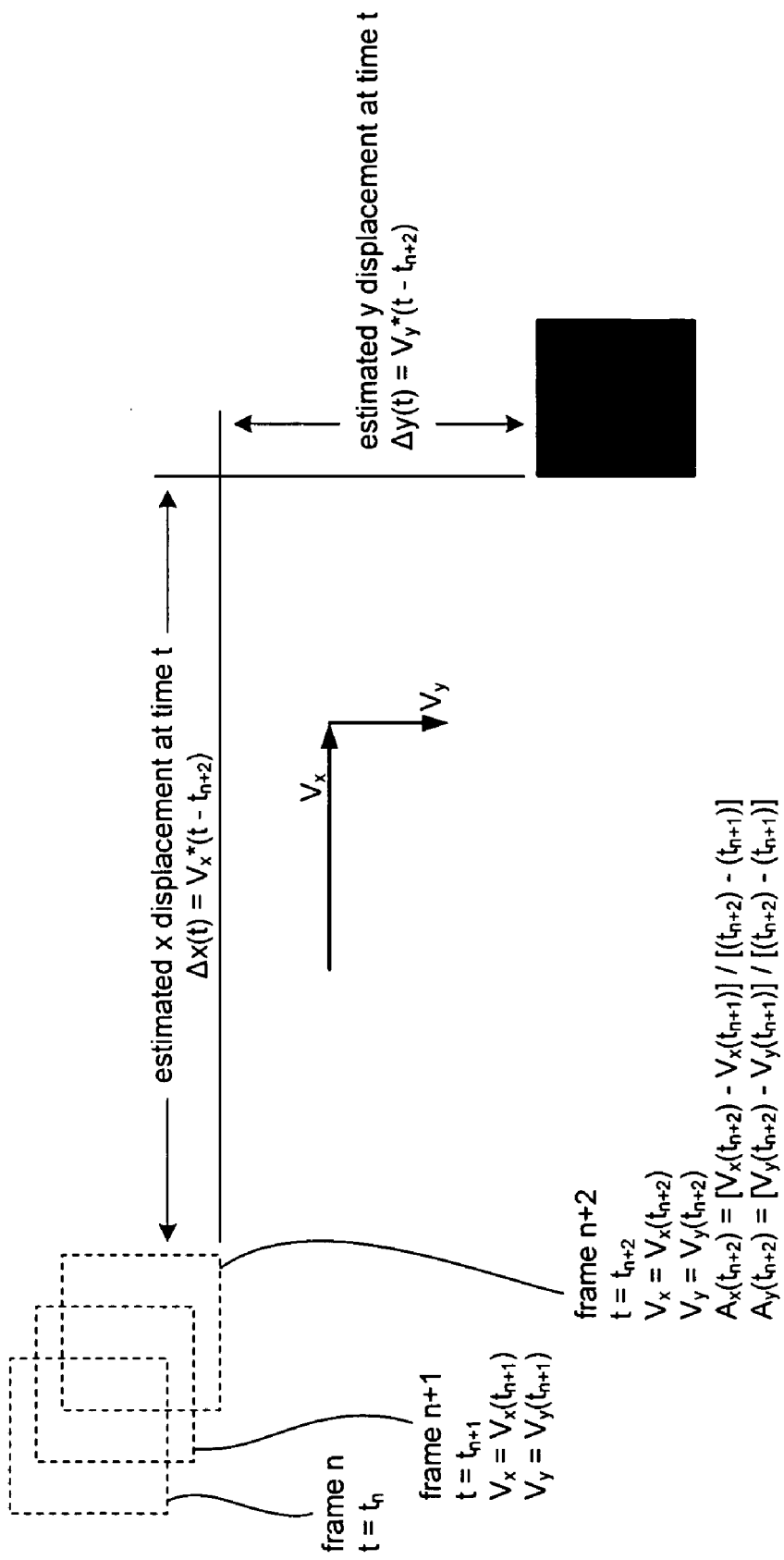
FIG. 10 illustrates calculation of mouse velocity and acceleration, as well as estimation of future displacement based on velocity.

In at least some embodiments, additional power savings are achieved through inertial navigation. In particular, the combination of a mouse and a mouse user's hand is treated as an inertial mass. Under many usage scenarios, the acceleration of the mouse/hand combination tends to be zero (or near-zero) most of the time. If acceleration of the mouse/hand combination is near zero, reasonably accurate estimations of future mouse displacement can be calculated using previously computed values for mouse velocity. As shown in FIG. 10, three successive frames (n, n+1 and n+2) are taken (at respective times $t_n$, $t_{n+1}$, $t_{n+2}$) to determine the horizontal ($V_x$) and vertical ($V_y$) components of mouse velocity. Based on mouse velocity at times $t_{n+1}$ and $t_{n+2}$, the horizontal ($A_x$) and vertical ($A_y$) components of acceleration at time $t_{n+2}$ are also calculated ($A_x = (V_x(t_{n+2}) - V_x(t_{n+1}))/(t_{n+2} - t_{n+1})$; $A_y = (V_y(t_{n+2}) - V_y(t_{n+1}))/(t_{n+2} - t_{n+1})$). If acceleration is zero, mouse displacement at an arbitrary time t can readily be calculated from $V_x$ and $V_y$. In particular, the x displacement at arbitrary time t from the position at $t_{n+2}$ (frame n+2) is simply the time since $t_{n+2}$ (i.e., $t - t_{n+2}$) multiplied by $V_x$. Similarly, the y displacement is the time since $t_{n+2}$ multiplied by $V_y$.

Figure 11:
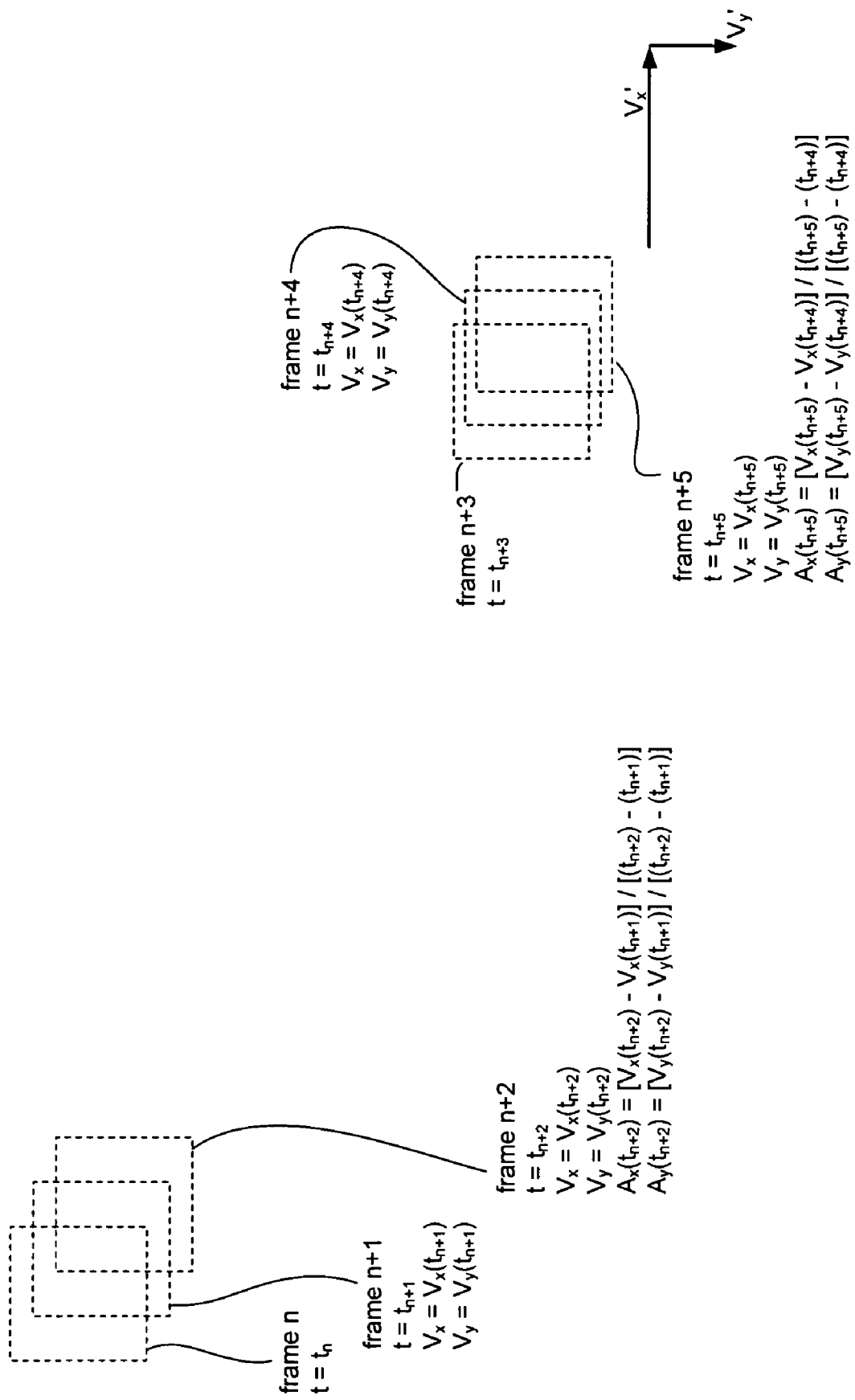
FIG. 11 further illustrates inertial mouse navigation according to at least some embodiments of the invention.

FIG. 11 further illustrates inertial navigation according to at least some embodiments of the invention. After determining velocity and acceleration based on frames n, n+1 and n+2, controller 24 (FIGS. 1 and 2) suspends imaging for a time Δt, and LED 20 and other imaging elements 30 are inactive. For times between $t_{n+2}$ and $t_{n+2} + \Delta t$, controller 24 assumes that $V_x$ and $V_y$ remain unchanged. Using values for $V_x$ and $V_y$ calculated during the last set of images n through n+2, controller 24 periodically calculates relative displacement along the x and y axes and inserts that information into mouse data packets. At times $t_{n+3}$ (where $t_{n+3} = t_{n+2} + \Delta t$), $t_{n+4}$ and $t_{n+5}$, controller 24 creates another set of images n+3, n+4 and n+5. Using data from these images, controller 24 updates $V_x$, $V_y$, $A_x$ and $A_y$. Assuming the updated $A_x$ and $A_y$ are sufficiently low, controller 24 uses the updated the values of $V_x$ and $V_y$ for the next group of relative displacement estimates. Controller 24 also modifies the interval Δt between $t_{n+5}$ and the next set of images (beginning at $t_{n+6}$, not shown). In at least some embodiments, controller 24 increases the interval Δt if mouse velocity (either the highest of $V_x$ and $V_y$, or a composite such as the vector sum of $V_x$ and $V_y$) has increased. In those embodiments, controller 24 decreases the interval Δt if mouse velocity has decreased.

If acceleration remains sufficiently small, the error between the estimated and actual displacement at time t is also relatively small. In many cases, this error is imperceptible to most human users. Even for relatively large values of Δt, the actual time between sets of images is quite short by human perception standards. Most users do not change the speed or direction of mouse motion by a large degree during such time intervals, and errors between actual and estimated mouse displacement tend to be small. On a macro scale, these errors are approximately the same in opposing directions (+/−x, +/−y). These errors thus tend to cancel out on a gross level, and a cursor controlled by mouse 10 will not wander unpredictably from a screen area in which the user may be working.

In some embodiments, controller 24 ceases inertial navigation upon determining that a composite acceleration exceeds a certain threshold level $A_{th}$ or that a composite velocity does not exceed a threshold level $V_{th}$. Composite acceleration is a value that accounts for both $A_x$ and $A_y$ (e.g., the magnitude of the vector sum of $A_x$ and $A_y$, $\sqrt{A_x^2+A_y^2}$); composite velocity is a value that accounts for both $V_x$ and $V_y$ (e.g., the magnitude of the vector sum of $V_x$ and $V_y$, $\sqrt{V_x^2+V_y^2}$). In such embodiments, controller 24 then returns to imaging at a rate sufficient to create overlapping images. Once composite acceleration is below $A_{th}$ and composite velocity is above $V_{th}$, controller 24 resumes inertial navigation.

Figure 12:
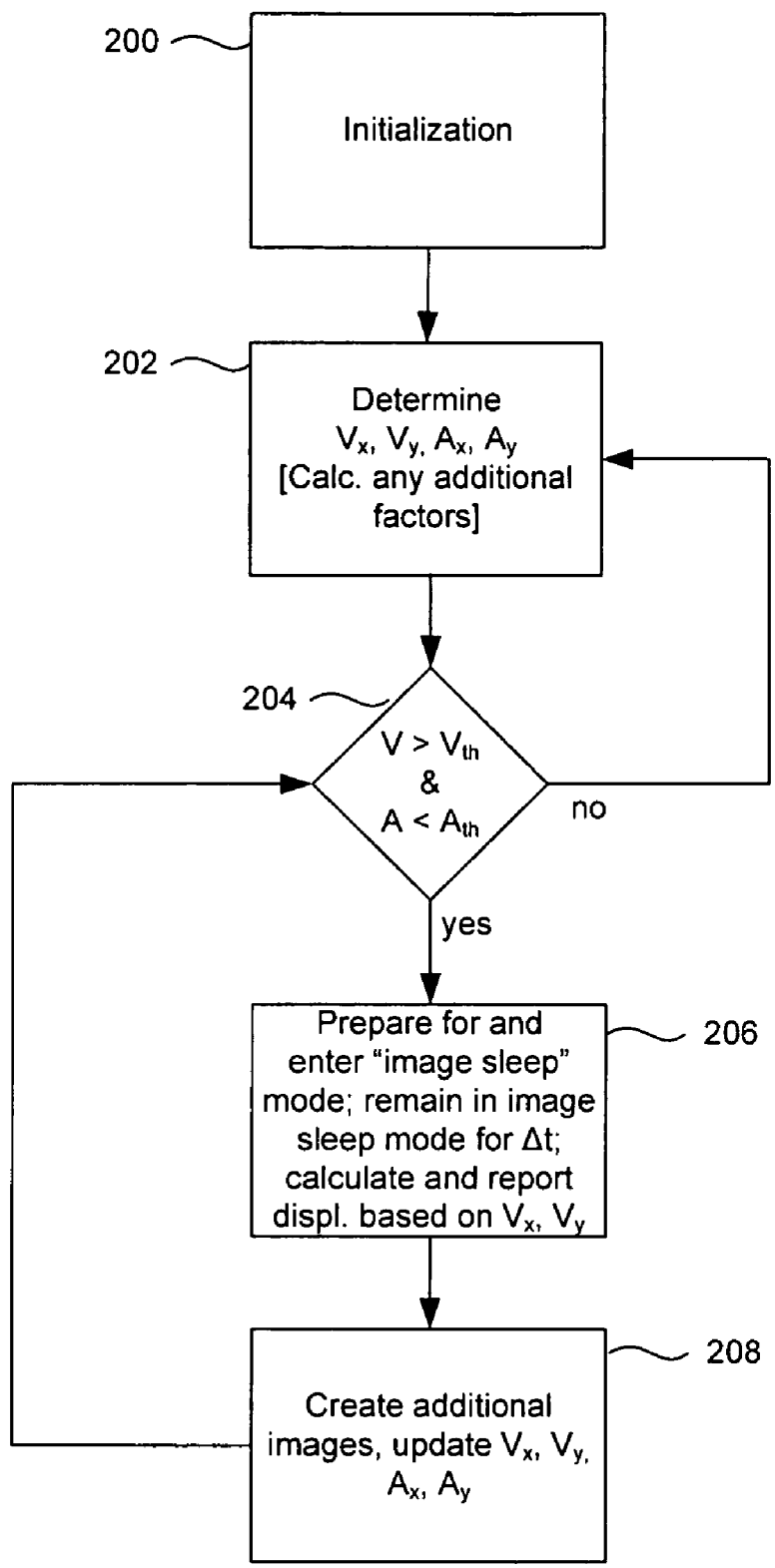
FIG. 12 is a flow chart showing an inertial navigation algorithm according to at least one embodiment of the invention.

FIG. 12 is a flow chart showing inertial navigation by mouse 10 according to at least one embodiment of the invention. After initialization at block 200, controller 24 determines $V_x$, $V_y$, $A_x$ and $A_y$ at block 202. Depending on the number of images used for the calculation, additional derivatives of mouse motion (e.g., jerk and twitch) are also calculated in some embodiments. At block 204, controller 24 determines whether the composite velocity V and acceleration A are within bounds of values for which inertial navigation is to be used. In particular, controller 24 determines if composite velocity is above $V_{th}$, the velocity threshold above which inertial navigation is to be used. Controller 24 also determines if composite acceleration is below $A_{th}$, the acceleration threshold below which inertial navigation is to be used. If composite velocity and composite acceleration are not within bounds (the "no" branch of block 204), controller 24 continues to calculate mouse displacement using overlapping images, and returns to block 202.

If composite velocity and composite acceleration are within bounds (the "yes" branch of block 204), controller 24 proceeds to block 206 and enters "image sleep" mode. In this mode, controller 24 ceases imaging, thereby turning off LED 20 and other imaging elements 30. While in image sleep mode, controller 24 calculates mouse displacement based on $V_x$ and $V_y$. Controller 24 remains in image sleep mode (block 206) for a time Δt. In at least some embodiments, Δt is a function of $V_x$, $V_y$, $A_x$ and $A_y$. At the end of Δt, controller 24 proceeds to block 208 and causes imaging circuitry 30 to create enough images to update $V_x$, $V_y$, $A_x$ and $A_y$ (as well as to calculate any other desired quantities), after which controller 24 returns to block 204. If composite velocity is below $V_{th}$ (based on updated $V_x$ and $V_y$) or composite acceleration is above $A_{th}$ (based on updated $A_x$ and $A_y$), controller 24 ceases inertial navigation and proceeds to block 202. If composite velocity is above $V_{th}$ and composite acceleration is below $A_{th}$, controller 24 proceeds to block 206, where a new Δt is determined and image sleep mode is resumed.

Figure 17:
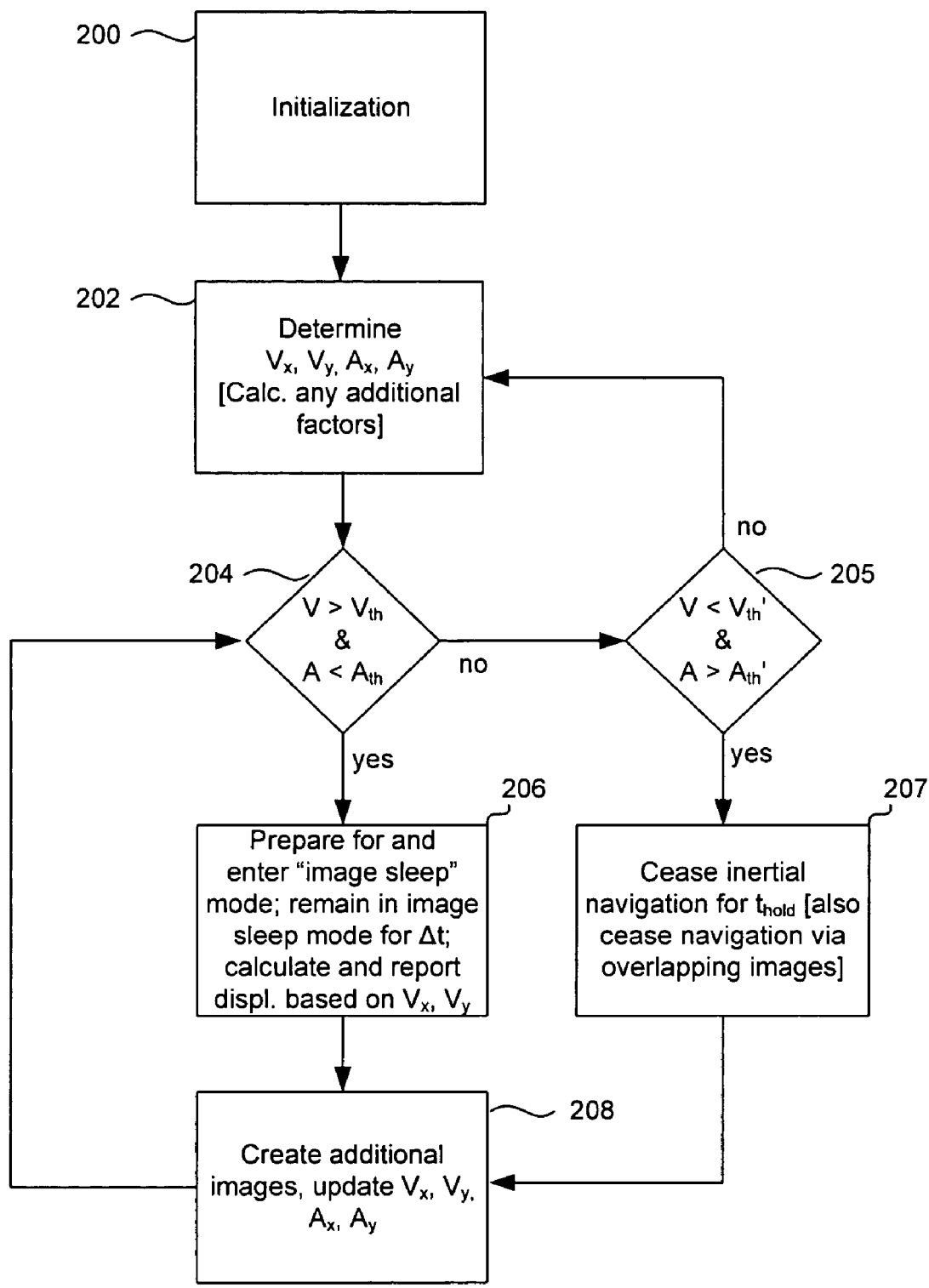
FIG. 17 is a flow chart showing an inertial navigation algorithm according to at least one further embodiment of the invention.

In still other embodiments, controller 24 does not resume continuous imaging merely because of high acceleration (e.g., when composite acceleration is above $A_{th}$). If composite acceleration and composite velocity are both relatively high, a user is probably engaged in a mouse operation that does not require high navigation accuracy. For example, a user may be rapidly moving a cursor from one major area of a display screen to another major area of that screen; in such a case, the user is typically not concerned with the precise location of the cursor until it is close to the desired destination. Although there may be somewhat larger navigational errors, they are unlikely to be noticed. If composite acceleration is high and composite velocity is low, the user may be changing direction of mouse motion (e.g., moving the mouse in an angular corner movement or in an arc), or may be starting or stopping movement. Once again, users will often be less cognizant of navigational errors under such circumstances. Moreover, if velocity is low, mouse displacement will also be low, thereby minimizing navigational errors. In certain embodiments, controller 24 thus ceases estimating mouse displacement for a predetermined time period when composite velocity is sufficiently low and composite acceleration is sufficiently high. During this time period, controller 24 does not attempt to determine displacement by correlating successive overlapping images. This predetermined time, which may be stored as a parameter in memory 28 (FIG. 2), can be chosen based on an estimate of the amount of time that mouse motion will be minimal during typical changes in mouse direction. FIG. 17 is similar to FIG. 12, but includes additional blocks 205 and 207. From the "no" branch of block 204, controller 24 determines at block 205 whether composite velocity V is below another threshold value $V_{th}'$ and whether composite acceleration A is above another threshold $A_{th}'$ (which may in some embodiments equal $A_{th}$). If not, controller 24 proceeds to block 202 as in FIG. 12. If so (the "yes" branch), controller 24 proceeds to block 207. In block 207, controller 24 ceases inertial navigation (and in some embodiments, navigation by correlation of successive overlapping images) for a time $t_{hold}$. At the end of $t_{hold}$, controller 24 goes to block 208, where $V_x$, $V_y$, $A_x$ and $A_y$ are updated.

Figure 13:
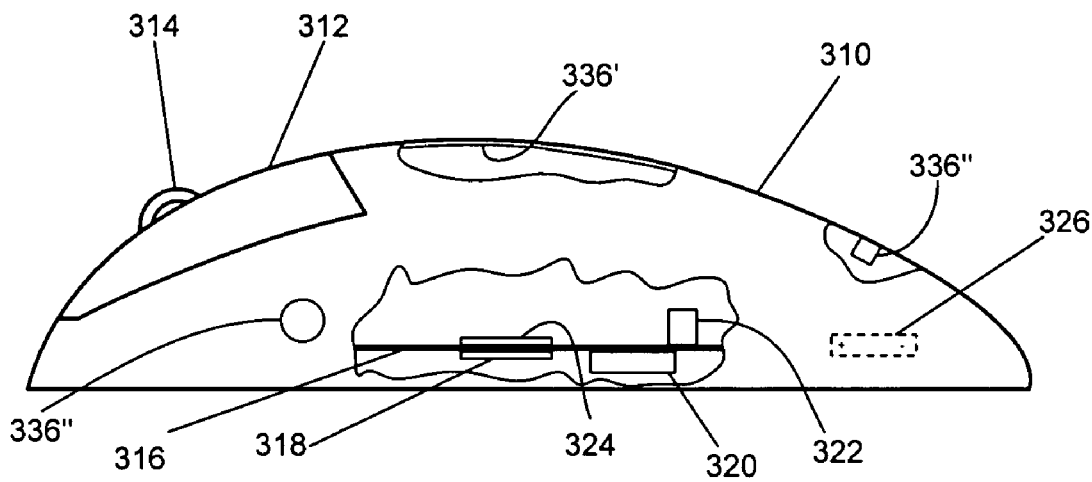
FIG. 13 is a cutaway side view of a computer mouse according to additional embodiments of the invention.
Figure 14:
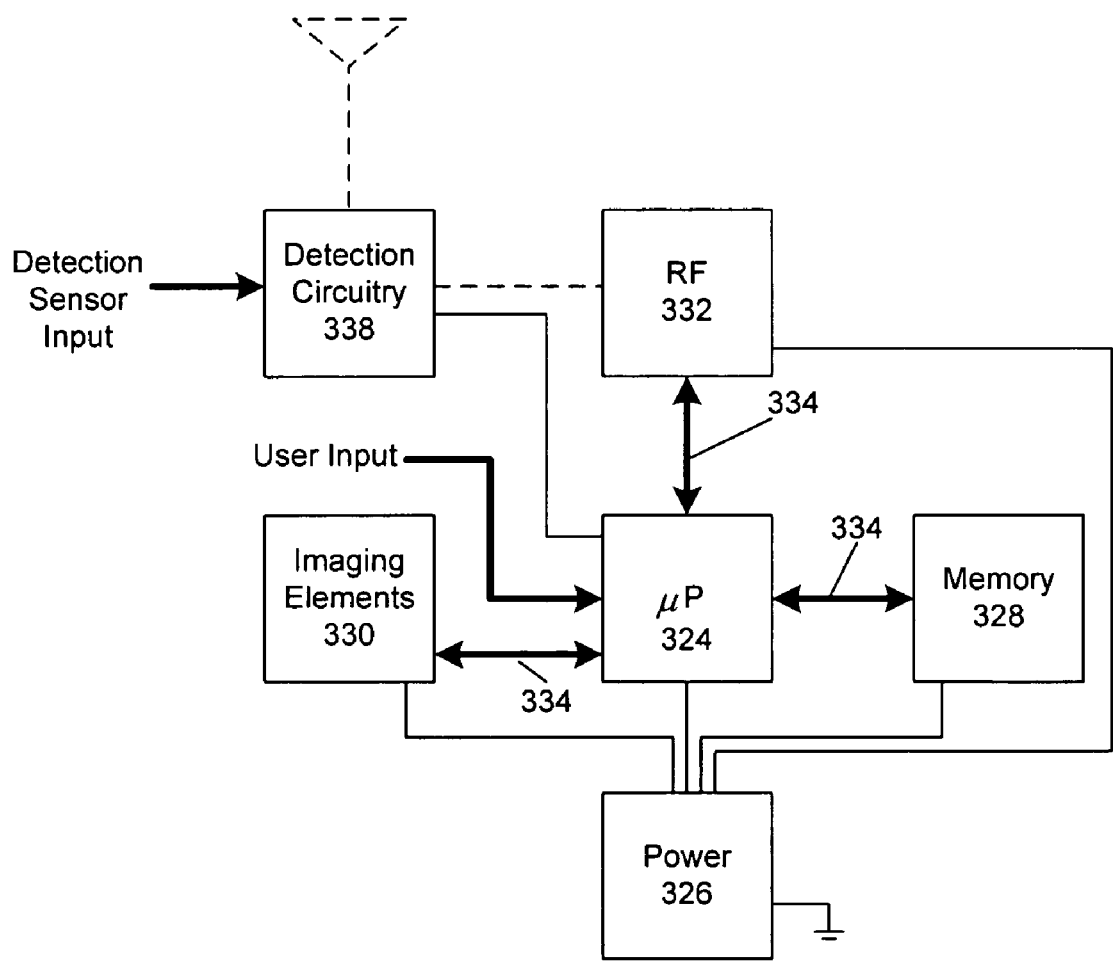
FIG. 14 is a block diagram of the mouse of FIG. 13.

In at least some embodiments, a mouse or other device according to the invention further includes proximity detection circuitry to determine whether a user's hand is present. When a user's hand is in proximity to the mouse, imaging rate varies based on one or more algorithms such as shown in FIG. 9, FIG. 12 or FIG. 17. When a hand is not in proximity, the mouse enters a standby mode in which various components of the mouse are turned off or are operated at a reduced rate. In some embodiments, LED 20 and other imaging elements 30 are periodically activated in standby mode to determine if the mouse has moved, but are activated at a rate that is slower than would be used to track motion during periods of active use to provide computer input. FIGS. 13 and 14 are modified versions of FIGS. 1 and 2 showing proximity detection components 336' and 336" and detection circuitry 338. In one embodiment, mouse 310 contains proximity detection component 336', which is a capacitive foil film, as described in commonly owned U.S. patent application Ser. No. 09/948,099, filed Sep. 7, 2001 and published under No. 20020035701 on Mar. 21, 2002. In another embodiment, mouse 300 contains proximity detection components 336", which include one or more photosensitive elements, as described in commonly owned U.S. patent application Ser. No. 10/058,384, filed on Jan. 30, 2002, now U.S. Pat. No. 6,703,599. Proximity detection could also be incorporated into RF circuitry 332, as described in commonly owned U.S. patent application Ser. No. 10/408,125, filed Apr. 8, 2003. Other types of proximity detection could also be used.

In still other embodiments, a mouse or other device according to the invention is configurable to adjust the algorithm of FIG. 9 and/or the algorithm of FIG. 12 based on type of use (or user profile) and an anticipated acceleration for that use type (or profile). For example, use intervals with frequent high acceleration and velocity components would typify game play, thus necessitating more rapid response to mouse movements. A mouse set for a game player would thus suspend inertial navigation or reduce the interval Δt between image sets. Low velocity, long interval transitions would be characteristic of graphical users requiring high precision. Low velocity, high accuracy operation is often important in such usage scenarios, and inertial navigation could thus be suspended (or Δt between image sets made very short) for low velocity movement. Between these two extremes would be average usage profiles typically associated with office applications and web browsing.

Figure 15:
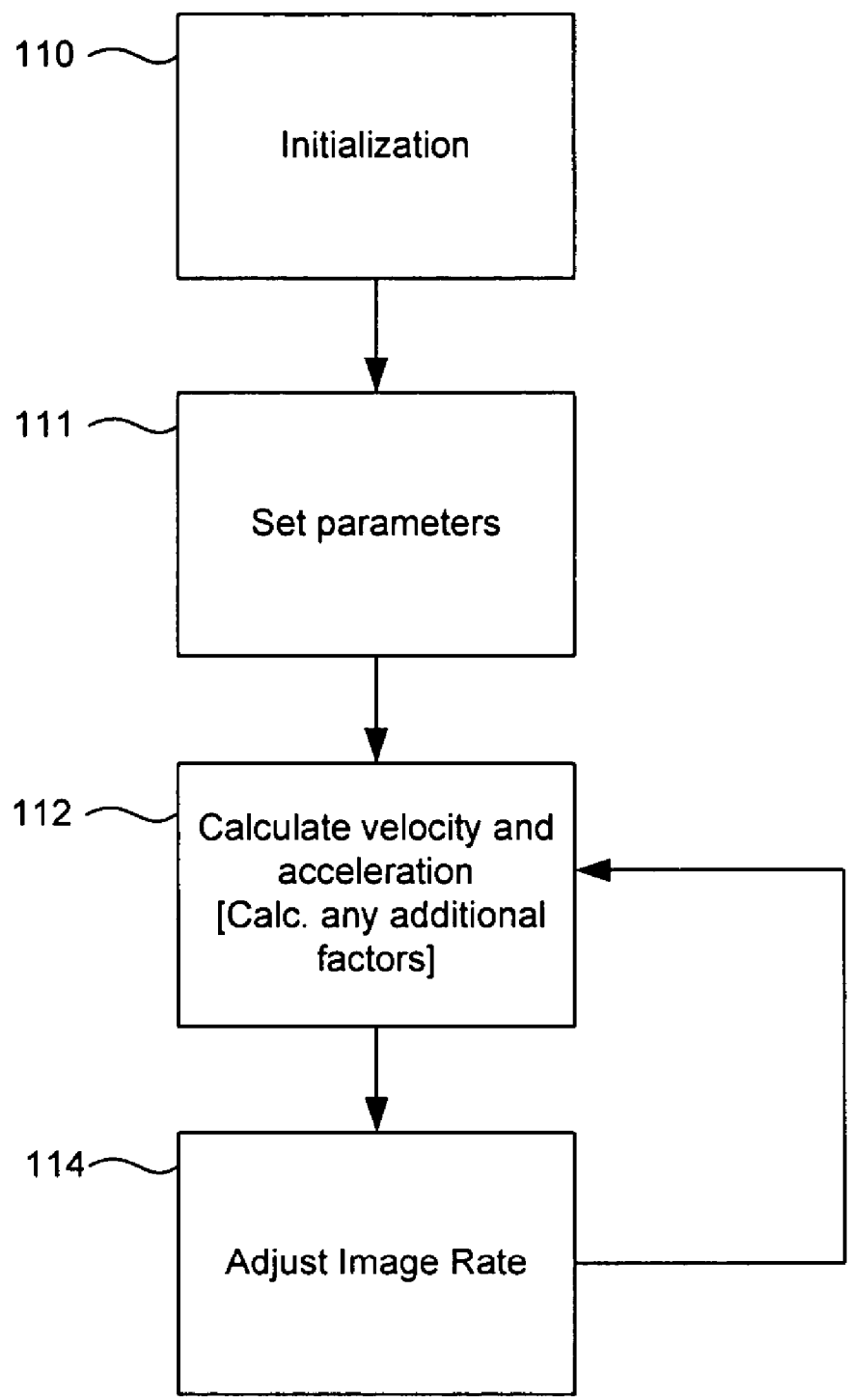
FIG. 15 is a flow chart for an algorithm varying imaging rate based on mouse velocity according to at least one other embodiment of the invention.

FIG. 15 is a modified version of FIG. 9 showing adjustment of algorithm parameters based on a usage profile. Blocks 110, 112 and 114 generally correspond to blocks 100, 102 and 104 of FIG. 9. At block 111, a usage profile is set. This could occur manually, such as by a user setting one or more program parameters on a computer with which mouse 10 (or 310) communicates (which parameter(s) would in turn be communicated to the mouse and stored in mouse memory), or by manually setting a switch or other control on the mouse. Once set, the parameter(s) determine the degree by which the imaging rate $F_{prediction}$ is adjusted for particular values of velocity and acceleration (e.g., the value of m could be varied based on the set parameter(s), the function F( ) adjusted, etc.)

Figure 16:
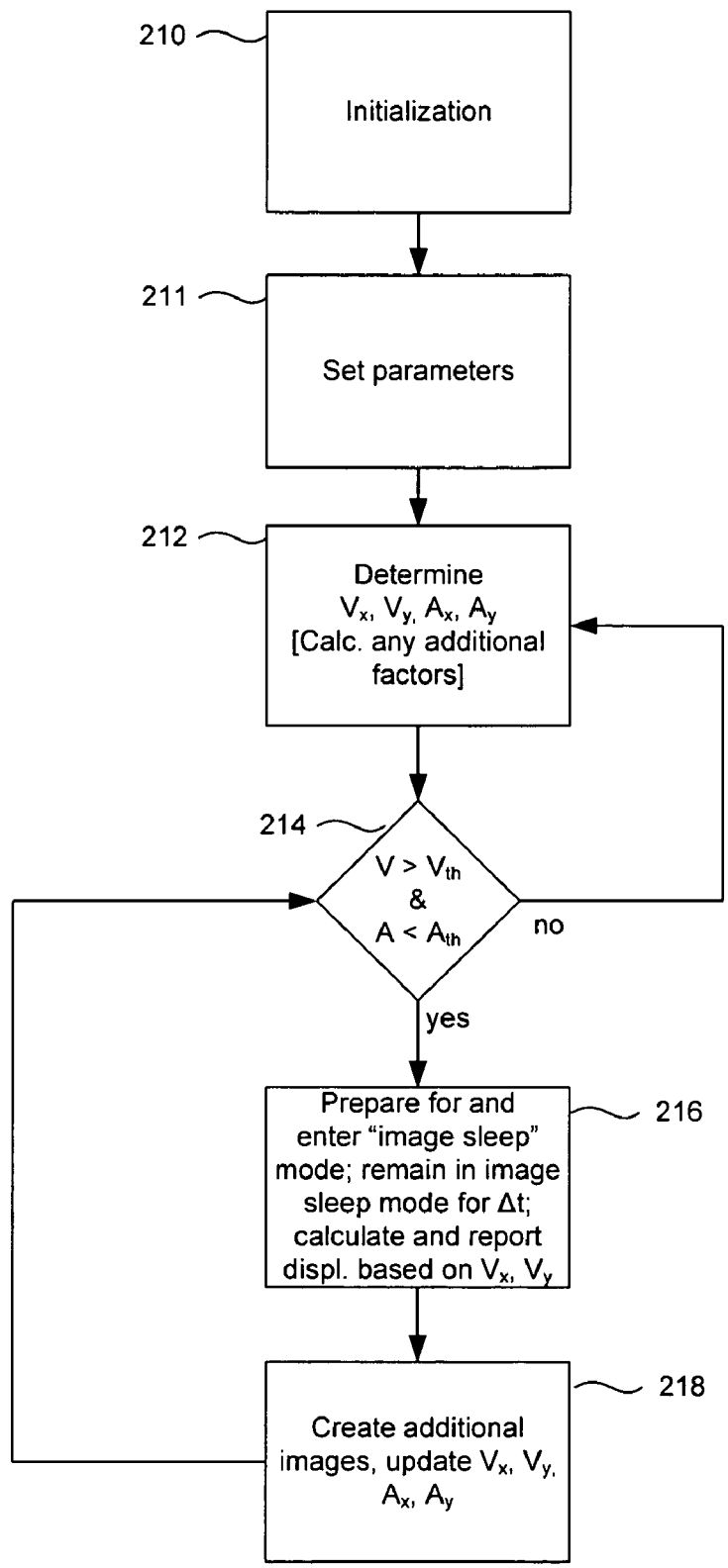
FIG. 16 is a flow chart showing an inertial navigation algorithm according to at least one other embodiment of the invention.

FIG. 16 is a modified version of FIG. 12 showing adjustment of algorithm parameters based on a usage profile. Blocks 210, 212, 214, 216 and 218 generally correspond to blocks 200, 202, 204, 206 and 208 of FIG. 12. At block 211, a usage profile is set.

Once set, the parameter(s) determines the degree by which the image sleep time Δt is adjusted for particular combinations of $V_x$, $V_y$, $A_x$ and $A_y$ values; values for $V_{th}$ and $A_{th}$ are also adjusted based on the usage profile parameters.

In still other embodiments, a mouse or other device according to the invention is configured to receive signals from an external source (such as a computer with which the mouse is communicating) indicating that imaging rate should be reduced. For example, activation of a screen saver program could cause transmission of a signal to a mouse indicating that imaging rate should be reduced and/or that inertial navigation should be suspended. Such a signal could be received via RF circuitry 32 (FIG. 2) and communicated to controller 24.

Although specific examples of carrying out the invention have been described, those skilled in the art will appreciate that there are numerous variations and permutations of the above described systems and techniques that fall within the spirit and scope of the invention as set forth in the appended claims. For example, an algorithm similar to FIG. 12 could be used for estimating displacement at certain times, and an algorithm similar to FIG. 9 used at other times. When varying an imaging rate, the rate of activating an illumination source may be varied, the rate of activating other imaging elements may be varied, or the rate of activating the illumination source and other imaging elements may be varied. Similarly, during periods of displacement estimation (or of no displacement determination by any means), activation of the illumination source, of other imaging components, or of the illumination source and other imaging components may be suspended. The invention could also be used in devices other than a mouse. Indeed, the invention can be implemented in connection with non-optical sensors (e.g., capacitive sensors, pressure sensors, etc.). The algorithms described herein are only examples of possible algorithms by which the invention might be implemented; other algorithms could be used. These and other modifications are within the scope of the invention as defined by the attached claims.

The invention claimed is:

1. A computer input device, comprising:
   an electronic imager positioned to create images of portions of a surface moving relative to the imager;
   an illumination source positioned to illuminate the portions of the surface imaged by the imager; and
   at least one controller coupled to the imager and the illumination source and configured to:
      selectively activate the illumination source,
      receive the images from the imager, and
      repeatedly adjust an activation rate for the illumination source according to a cyclical procedure comprising:
         determining, based on at least some of the images, a current imager velocity relative to the surface,
         activating the illumination source at one of at least three activation rates when the imager is moving relative to the surface and the current imager velocity is being determined,
         calculating a predicted imager velocity based on the current imager velocity and the imager velocity determined during a prior activation rate adjustment cycle, and
         selecting one of the at least three activation rates as the adjusted activation rate based on the predicted imager velocity.

2. The computer input device of claim 1, wherein the computer input device is a battery-powered, optically-tracking computer mouse.

3. The computer input device of claim 2, further comprising a proximity detector, and wherein the controller is further configured to vary the illumination source activation rate between a reduced standby rate and one of the at least three rates based at least in part on an output of the proximity detector.

4. The computer input device of claim 2, wherein the controller is further configured to vary the illumination source activation rate between a reduced standby rate and one of the at least three rates based at least in part on a signal from an external source, said signal indicating the illumination source activation rate should be reduced.

5. The computer input device of claim 1, further comprising a memory having a user profile parameter stored thereon, the user profile parameter representing a type of use, and wherein the controller is further configured to vary the illumination source activation rate based on which of multiple types of uses is represented by the user profile parameter.

6. A computer input device, comprising:
   an electronic imager positioned to create images of portions of a surface moving relative to the imager;
   an illumination source positioned to illuminate the portions of the surface imaged by the imager; and
   at least one controller coupled to the imager and the illumination source and configured to:
      selectively activate the illumination source,
      receive the images from the imager,
      determine, based on at least some of the images, an imager velocity relative to the surface,
      activate the illumination source at one of at least three activation rates when the imager is moving relative to the surface and imager velocity is being determined, and select one of the at least three activation rates based on the imager velocity,
wherein the controller is configured to select the activation rate by selecting a rate $F_{prediction}$ based on the equation $F_{prediction} = F(V_{margin})$, wherein:
F( ) is a function mapping to a velocity V the minimum frame rate necessary to accurately determine that velocity, $$V_{margin} = \begin{cases} (1+m) * V_{prediction}, \text{ if greater than } V_{min}, \text{ and} \\ V_{min} \text{ otherwise,} \end{cases}$$

m=a constant,
$V_{min}$=a minimum frame rate supported by the device,
$S_0 = V_0$,
$V_0$=current velocity,
$A_0 = (V_0/|V_0|)*(V_0 - V_{-1})$,
$V_{-1}$=a previous velocity, and $$V_{prediction} = \begin{cases} |S_0 + A_0|, \text{ if } A_0 > 0, \text{ and} \\ |S_0| \text{ if } A_0 < 0. \end{cases}$$

7. A computer input device, comprising:
an electronic imager positioned to create images of portions of a surface moving relative to the imager;
an illumination source positioned to illuminate the portions of the surface imaged by the imager; and
at least one controller coupled to the imager and the illumination source and configured to:
selectively activate the illumination source,
receive the images from the imager,
determine, based on a first set of images received from the imager, an imager velocity and an imager acceleration relative to the surface and relative to one of three velocity levels,
determine whether an acceleration value based on the determined acceleration is below a threshold acceleration;
upon determining that the acceleration value is below the threshold acceleration,
suspend activation of the illumination source for a time Δt which is determined based on at least one of the imager velocity and the imager acceleration, and
estimate imager displacement relative to the surface at each of a plurality of times during Δt, wherein each of said estimates is based on the imager velocity and a different amount of time elapsed since movement from a position corresponding to one or more of the images of the first set.

8. The computer input device of claim 7, wherein the computer input device is a battery-powered, optically-tracking computer mouse.

9. The computer input device of claim 7, wherein the controller is further configured to:
determine a revised imager velocity and revised imager acceleration based on a second set of images created subsequent to the expiration of Δt,
determine a revised time period Δt' based on at least one of the revised velocity and the revised acceleration, and
estimate imager displacement relative to the surface at each of a second plurality of times during Δt', wherein each of said estimates is based on the revised imager velocity and a different amount of time elapsed since movement from a position corresponding to one or more of the images of the second set.

10. The computer input device of claim 7, wherein the controller is further configured to:
determine a revised imager velocity and revised imager acceleration based on a second set of images created subsequent to the expiration of Δt,
determine whether a velocity value based on the revised imager velocity is above a threshold velocity and whether an acceleration value based on the revised imager acceleration is below a threshold acceleration, and
upon determining that either the velocity value is not above the threshold velocity or the acceleration value is not below the threshold acceleration, determine imager displacement based on images of overlapping portions of the surface.

11. The computer input device of claim 10, wherein the velocity value is the revised imager velocity and the acceleration value is the revised imager acceleration.

12. The computer input device of claim 10, wherein:
the revised imager velocity is a velocity of the imager along an axis,
the revised imager acceleration is an acceleration along the axis,
the velocity value is a composite of the revised imager velocity and a velocity along an orthogonal axis, and
the acceleration value is a composite of the revised imager acceleration and an acceleration along the orthogonal axis.

13. The computer input device of claim 10, wherein the controller is further configured, during periods when the velocity value is not above the threshold velocity or the acceleration value is not below the threshold acceleration, to:
determine subsequent imager velocities relative to the surface,
increase a rate of illumination source activation based on an increase in the subsequent imager velocities, and
decrease the rate of illumination source activation based on a decrease in the subsequent imager velocities.

14. The computer input device of claim 7, further comprising a memory having a preset time value stored therein, and wherein the controller is further configured to:
determine a revised imager velocity and revised imager acceleration based on a second set of images created subsequent to the expiration of Δt,
determine whether a velocity value based on the revised imager velocity is above a threshold velocity and whether an acceleration value based on the revised imager acceleration is below a threshold acceleration, and
upon determining that the velocity value is below the threshold velocity and the acceleration value is above the threshold acceleration, cease estimating the imager displacement for a time period equal to the preset time value.

15. The computer input device of claim 7, further comprising a memory having at least one user profile parameter stored thereon, and wherein the controller is further configured to vary the manner in which the time Δt is determined based at least in part on said parameter.

16. A computer-readable medium having stored thereon data representing sequences of instructions which, when executed by a processor, cause the processor to perform steps comprising:

selectively activating an illumination source positioned on a computer input device;
receiving from an imager sets of data indicative of portions of a surface illuminated by the illumination source; and
repeatedly adjusting an activation rate for the illumination source according to a cyclical procedure comprising:
determining, based on at least some of the received data sets, a current imager velocity relative to the surface;
activating the illumination source at one of at least three activation rates when the imager is moving relative to the surface and the current imager velocity is being determined; and
calculating a predicted imager velocity based on the current imager velocity and the imager velocity determined during a prior activation rate adjustment cycle;
selecting one of the at least three activation rates as the adjusted activation rate based on the predicted imager velocity.

17. A computer-readable medium having stored thereon data representing sequences of instructions which, when executed by a processor, cause the processor to perform steps comprising:
selectively activating an illumination source positioned on a computer input device;
receiving from an imager sets of data indicative of portions of a surface illuminated by the illumination source;
determining, based on at least some of the received data sets, an imager velocity relative to the surface;
activating the illumination source at one of at least three activation rates when the imager is moving relative to the surface and imager velocity is being determined; and
selecting one of the at least three activation rates based on the imager velocity,
wherein said selecting one of the at least three activation rates comprises selecting a rate $F_{prediction}$ based on the equation $F_{prediction} = F(V_{margin})$, wherein:
F( ) is a function mapping to a velocity V the minimum frame rate necessary to accurately determine that velocity, $$V_{margin} = \begin{cases} (1+m) * V_{prediction}, \text{ if greater than } V_{min}, \text{ and} \\ V_{min} \text{ otherwise,} \end{cases}$$

m=a constant,
$V_{min}$=a minimum frame rate supported by the device,
$S_0=V_0$,
$V_0$=current velocity,
$A_0=(V_0/|V_0|)*(V_0-V_{-1})$,
$V_{-1}$=a previous velocity, and $$V_{prediction} = \begin{cases} |S_0 + A_0|, \text{ if } A_0 > 0, \text{ and} \\ |S_0| \text{ if } A_0 < 0. \end{cases}$$

18. A computer-readable medium having stored thereon data representing sequences of instructions which, when executed by a processor, cause the processor to perform steps comprising:
selectively activating an illumination source positioned on a computer input device;
receiving from an imager groups of data sets, the data sets indicative of portions of a surface illuminated by the illumination source;
determining, based on a first group of received data sets, an imager velocity and an imager acceleration relative to the surface and relative to one of three predetermined velocity levels;
determining whether an acceleration value based on the determined acceleration is below a threshold acceleration; and
upon determining that the acceleration value is below the threshold acceleration,
suspend activation of the illumination source for a time $\Delta t$ which is determined based on at least one of the imager velocity and the imager acceleration, and
estimating imager displacement relative to the surface at each of a plurality of times during $\Delta t$, wherein each of said estimated imager displacement is based on the imager velocity and a different amount of time elapsed since movement from a position corresponding to one or more of the data sets of the first group.

19. The computer-readable medium of claim 18, comprising additional data representing sequences of instructions which, when executed by a processor, cause the processor to perform additional steps comprising:
determining a revised imager velocity and revised imager acceleration based on a second group of received data sets, the second group of received data sets being created subsequent to the expiration of $\Delta t$;
determining a revised time period $\Delta t'$ based on at least one of the revised velocity and the revised acceleration; and
estimating imager displacement relative to the surface at each of a second plurality of times during $\Delta t'$, wherein each of said estimates is based on the revised imager velocity and a different amount of time elapsed since movement from a position corresponding to one or more of the data sets of the second group.

20. The computer-readable medium of claim 18, comprising additional data representing sequences of instructions which, when executed by a processor, cause the processor to perform additional steps comprising:
determining a revised imager velocity and revised imager acceleration based on a second group of received data sets, the second group of received data sets being created subsequent to the expiration of $\Delta t$;
determining whether a velocity value based on the revised imager velocity is above a threshold velocity and whether an acceleration value based on the revised imager acceleration is below a threshold acceleration; and
upon determining that either the velocity value is not above the threshold velocity or the acceleration value is not below the threshold acceleration, determining imager displacement based on additional received data sets indicative of overlapping surface portions.

21. The computer-readable medium of claim 20, wherein the velocity value is the revised imager velocity and the acceleration value is the revised imager acceleration.

22. The computer-readable medium of claim 20, wherein:
the revised imager velocity is a velocity of the imager along an axis,
the revised imager acceleration is an acceleration along the axis,
the velocity value is a composite of the revised imager velocity and a velocity along an orthogonal axis, and
the acceleration value is a composite of the revised imager acceleration and an acceleration along the orthogonal axis.

23. The computer-readable medium of claim 20, comprising additional data representing sequences of instructions which, when executed by a processor, cause the processor to perform additional steps comprising:

determining, during periods when the velocity value is not above the threshold velocity or the acceleration value is not below the threshold acceleration, subsequent imager velocities relative to the surface;

increasing a rate of illumination source activation based on an increase in the subsequent imager velocities; and decreasing the rate of illumination source activation based on a decrease in the subsequent imager velocities.

24. The computer-readable medium of claim 18, comprising additional data representing sequences of instructions which, when executed by a processor, cause the processor to perform additional steps comprising:

determining a revised imager velocity and revised imager acceleration based on a second group of received data sets, the second group of received data sets being created subsequent to the expiration of $\Delta t$;

determining whether a velocity value based on the revised imager velocity is below a threshold velocity and whether an acceleration value based on the revised imager acceleration is above a threshold acceleration; and upon determining that the velocity value is below the threshold velocity and the acceleration value is above the threshold acceleration, ceasing estimation of the imager displacement for a time period equal to a preset time value stored upon the computer-readable medium.

25. The computer-readable medium of claim 18, wherein said selectively activating comprises selectively activating at least one of an edge-emitting laser, a vertical cavity surface emitting laser, and a light emitting diode.

* * * * *